(12) United States Patent
Fujino

(10) Patent No.: US 12,515,201 B2
(45) Date of Patent: Jan. 6, 2026

(54) Ce—Zr COMPOSITE OXIDE AND EXHAUST GAS PURIFICATION CATALYST USING SAME

(71) Applicant: UMICORE SHOKUBAI JAPAN CO., LTD., Tokoname (JP)

(72) Inventor: Daishi Fujino, Kobe (JP)

(73) Assignee: UMICORE SHOKUBAI JAPAN CO., LTD, Tokoname (JP)

( * ) Notice: Subject to any disclaimer, the term of this patent is extended or adjusted under 35 U.S.C. 154(b) by 465 days.

(21) Appl. No.: 17/924,423

(22) PCT Filed: Apr. 19, 2021

(86) PCT No.: PCT/JP2021/015846
§ 371 (c)(1),
(2) Date: Nov. 10, 2022

(87) PCT Pub. No.: WO2021/251000
PCT Pub. Date: Dec. 16, 2021

(65) Prior Publication Data
US 2023/0271164 A1 Aug. 31, 2023

(30) Foreign Application Priority Data
Jun. 10, 2020 (JP) .................. 2020-100958

(51) Int. Cl.
*B01J 23/10* (2006.01)
*B01D 53/94* (2006.01)
(Continued)

(52) U.S. Cl.
CPC ............. *B01J 23/10* (2013.01); *B01D 53/94* (2013.01); *B01J 23/44* (2013.01); *B01J 35/394* (2024.01);
(Continued)

(58) Field of Classification Search
CPC .......... B01J 23/10; B01J 23/44; B01J 35/394; B01J 35/56; B01J 37/06; B01J 37/08;
(Continued)

(56) References Cited

U.S. PATENT DOCUMENTS 10,173,200 B2    1/2019  Huang et al.
2002/0061816 A1* 5/2002  Uenishi ................ B01D 53/945
                                                          502/304

(Continued)

FOREIGN PATENT DOCUMENTS

CN      1750865 A      3/2006
CN     103 752 331 A   4/2014
(Continued)

OTHER PUBLICATIONS

Machine translation of WO2016158656A1 (Year: 2016).*
(Continued)

*Primary Examiner* — Sally A Merkling
*Assistant Examiner* — Logan Edward Laclair
(74) *Attorney, Agent, or Firm* — Smith, Gambrell & Russell, LLP

(57) ABSTRACT

A Ce—Zr composite oxide contains cerium and zirconium, wherein an uneven distribution ratio of cerium atoms is 1.80 or less. A method for producing a Ce—Zr composite oxide includes an acid treatment step of bringing at least one selected from the group consisting of sulfuric acid, nitric acid, and hydrochloric acid, in an amount of 4 to 28 parts by mass with respect to 100 parts by mass of the raw material composite oxide, into contact with the surface of a raw material composite oxide containing cerium and zirconium, and a calcination step of calcining the treated composite oxide obtained in the acid treatment step at 400 to 1200° C. for 5 to 300 minutes.

15 Claims, 9 Drawing Sheets

(51) Int. Cl.
*B01J 23/44* (2006.01)
*B01J 35/30* (2024.01)
*B01J 35/40* (2024.01)
*B01J 35/56* (2024.01)
*B01J 37/06* (2006.01)
*B01J 37/08* (2006.01)
*C01G 25/00* (2006.01)
*F01N 3/28* (2006.01)

(52) U.S. Cl.
CPC ............ *B01J 35/40* (2024.01); *B01J 37/06* (2013.01); *B01J 37/08* (2013.01); *C01G 25/006* (2013.01); *F01N 3/2803* (2013.01); B01D 2255/1023 (2013.01); B01D 2255/2061 (2013.01); B01D 2255/2063 (2013.01); B01D 2255/2065 (2013.01); B01D 2255/20715 (2013.01); B01D 2255/407 (2013.01); B01D 2255/908 (2013.01); *B01J 35/56* (2024.01); C01P 2002/50 (2013.01); F01N 2370/04 (2013.01)

(58) Field of Classification Search
CPC ........ B01J 21/066; B01J 35/396; B01J 35/40; B01J 35/613; B01J 37/0036; B01J 37/0215; B01J 37/0234; B01J 37/031; B01J 2523/00; B01J 23/63; B01D 53/94; B01D 2255/1023; B01D 2255/2061; B01D 2255/2063; B01D 2255/2065; B01D 2255/20715; B01D 2255/407; B01D 2255/908; B01D 2258/01; C01G 25/006; C01G 25/00; F01N 3/2803; F01N 2370/04; F01N 3/0864; F01N 2330/00; F01N 2370/00; F01N 2510/063; F01N 3/28; C01P 2002/50; C01P 2002/30; C01P 2002/52; C01P 2002/54; C01P 2004/61; C01P 2006/12; Y02T 10/12

See application file for complete search history.

(56) References Cited

U.S. PATENT DOCUMENTS

| | | | |
|---|---|---|---|
| 2006/0105908 A1 | 5/2006 | Miyake et al. | |
| 2012/0129681 A1* | 5/2012 | Adib | B01J 35/23 977/775 |
| 2015/0266004 A1 | 9/2015 | Kumatani et al. | |
| 2020/0114334 A1 | 4/2020 | Morikawa et al. | |

FOREIGN PATENT DOCUMENTS

| | | |
|---|---|---|
| CN | 111111640 A | 10/2019 |
| JP | H10202102 A | 8/1998 |
| JP | 2004002147 A | 1/2004 |
| JP | 2008-150237 A | 7/2008 |
| JP | 2016-185531 A | 10/2016 |
| JP | 2018-506424 A | 3/2018 |
| JP | 2020059630 A | 4/2020 |
| WO | WO-2016158656 A1 * | 10/2016 ............ B01D 53/94 |

OTHER PUBLICATIONS

Wu et al. (Effect of preparation methods on the structure and redox behavior of platinum-ceria-zirconia catalysts, Chemical Engineering Journal, 2005) (Year: 2005).*
Notice of Reasons for Refusal mailed Feb. 20, 2024 for Japanese Patent Application No. 2022-530042 (3 pages in Japanese; 3 pages English translation).
Decision to Grant a Patent mailed May 28, 2025 for Japanese Patent Application No. 2022-530042 (4 pages in Japanese; 2 pages English translation).
Search Report mailed Sep. 1, 2023 for Chinese Patent Application 202180037153.1 (2 pages).
Office Action (The Second Office Action) issued on Jan. 23, 2024, by the State Intellectual Property Office of the People's Republic of China in corresponding Chinese Patent Application No. 202180037153.1, and an English Translation of the Office Action. (9 pages).
Office Action (Notice of Reasons for Refusal) issued Oct. 3, 2023, by the Japan Patent Office in corresponding Japanese Patent Application No. 2022-530042 and an English translation of the Office Action. (7 pages).
Si, "Preparation, Characterization and Properties of Ceria Powders and Films", cnki.net, Jan. 15, 2015, Jilin University, Ph.D. thesis, pp. 28-29, with English translation. (8 pages).
Zhang, "Study on the oxidation activity and mechanism of solid acid modified Pt/CeO2—ZrO2 external chemical agent B Effects of solid acid modification on Pt/CeO2—ZrO2 catalyst for propane oxidation", cnki.net, Jan. 15, 2013, Tsinghua University, Master thesis, p. 17, with English translation. (6 pages).
Office Action (First Notice of Examination Action) issued Sep. 12, 2023, by the National Intellectual Property Administration, P. R. China in corresponding Chinese Patent Application No. 202180037153.1 and an English translation of the Office Action. (16 pages).
De Rivas, Beatriz, et al., "Impact of induced chlorine-poisoning on the catalytic behavior of Ce0.5Zr0.5O2 and Ce0.15Zr0.85O2 in the gas-phase oxidation of chlorinated VOCs", Applied Catalysis B:Environmental, 2011, vol. 104, pp. 373-381, Elsevier B.V., XP028202466, Mar. 2011. (9 pages).
De Rivas, Beatriz, et al., "Promoted activity of sulphated Ce/Zr mixed oxides for chlorinated VOC oxidative abatement", Applied Catalysis B:Environmental, 2013, vol. 129, pp. 225-235, Elsevier B.V., XP055890527, Sep. 2012. (20 pages).
International Search Report (PCT/ISA/210) with translation and Written Opinion (PCT/ISA/237) mailed on Jun. 22, 2021, by the Japanese Patent Office as the International Searching Authority for International Application No. PCT/JP2021/015846. (11 pages).
Extended European Search Report dated Jun. 5, 2024, issued by the European Patent Office in corresponding European Application No. 21822335.2-1014, (13 pages).

* cited by examiner

Ce—Zr COMPOSITE OXIDE AND EXHAUST GAS PURIFICATION CATALYST USING SAME

TECHNICAL FIELD

The present invention relates to a Ce—Zr composite oxide and an exhaust gas purification catalyst using the same. More particularly, the present invention relates to a technique for improving the durability of the oxygen storage/release performance of a Ce—Zr composite oxide which is used as an oxygen storage material in an exhaust gas purification catalyst.

BACKGROUND ART

Automobile exhaust gas regulations have been strengthened in recent years. In order to cope with this, further improvement of the exhaust gas purification performance of exhaust gas purification catalysts has been required.

Exhaust gas mainly contains carbon monoxide (CO), hydrocarbons (HC), and nitrogen oxides (NOx). In order to purify these, it is necessary to simultaneously oxidize carbon monoxide (CO) and hydrocarbons (HC) and reduce nitrogen oxides (NOx). By maintaining the air-fuel ratio (A/F) near the theoretical air-fuel ratio (A/F=14.6), oxidation and reduction can be simultaneously performed, but in actual operation, the A/F fluctuates to some extent. Therefore, for the purpose of absorbing such fluctuations, an oxygen storage material is contained in the exhaust gas purification catalyst.

The oxygen storage material stores oxygen in an excess oxygen atmosphere ($2Ce_2O_3 + \frac{1}{2}O_2 \rightarrow 2CeO_2$) due to the oxygen storage and release performance (Oxygen Storage/Release capacity; OSC) of $CeO_2$, and on the other hand, when oxygen is lacking, it releases oxygen ($2CeO_2 \rightarrow 2Ce_2O_3 + \frac{1}{2}O_2$). This can maintain the A/F in the atmosphere on the catalyst surface near the theoretical air-fuel ratio (A/F=14.6).

However, since the OSC performance and durability of $CeO_2$ alone are not sufficient for practical use, a method for improving these by adding $ZrO_2$ to $CeO_2$ has been adopted. For example, JP-A-2004-2147 discloses a method for producing a ceria-zirconia solid solution, characterized by including a mixing step of preparing a mixture, in which a cerium compound and a zirconium compound, each of which decomposes through heating, and an organic substance are contained, a solution resulting from dissolution of the cerium compound and the zirconium compound at least during heating is formed, and at least part of the organic substance is in a liquid state after decomposing at least part of the cerium compound and the zirconium compound, a decomposition step of decomposing the mixture by heating the mixture, thereby forming a uniform precursor, and a calcination step of calcining the precursor, thereby removing the organic substance by combustion, and also forming a ceria-zirconia solid solution. According to JP-A-2004-2147, a ceria-zirconia solid solution having high oxygen storage capacity and excellent heat resistance is obtained by this production method.

SUMMARY OF INVENTION

However, the conventional Ce—Zr composite oxide has a problem in that the oxygen storage/release performance deteriorates when it is exposed to high temperature exhaust gas for a long period of time.

In view of this, an object of the present invention is to provide a means for suppressing the deterioration of oxygen storage/release performance caused by long-term exposure to exhaust gas in a Ce—Zr composite oxide.

The present inventor conducted intensive studies to solve the above problem. In the course of these studies, surprisingly, it was found that by performing a specific acid treatment step when producing an oxygen storage material, an oxygen storage material having excellent oxygen storage/release performance, even after having been exposed to exhaust gas for a long period of time, is obtained. When further studies on the obtained oxygen storage material were conducted, it was found that by setting an uneven distribution ratio of cerium atoms within a specific range in the oxygen storage material after thermal aging, the above problem can be solved, and thus the present invention was completed.

That is, a Ce—Zr composite oxide according to one embodiment of the present invention contains cerium and zirconium and is characterized in that an uneven distribution ratio of cerium atoms is 1.80 or less.

Further, a method for producing a Ce—Zr composite oxide according to another embodiment of the present invention includes an acid treatment step of bringing at least one type of acid selected from the group consisting of sulfuric acid, nitric acid, and hydrochloric acid, in an amount of 4 to 28 parts by mass with respect to 100 parts by mass of the raw material composite oxide, into contact with the surface of a raw material composite oxide containing cerium and zirconium, and a calcination step of calcining the treated composite oxide obtained in the acid treatment step at 400 to 1200° C. for 5 to 300 minutes, wherein in the acid treatment step, the acid in the form of an aqueous solution is brought into contact with the surface of the raw material composite oxide, and the concentration of the acid in the aqueous solution is 15 to 80 mass %.

DESCRIPTION OF EMBODIMENTS

Figure 1:
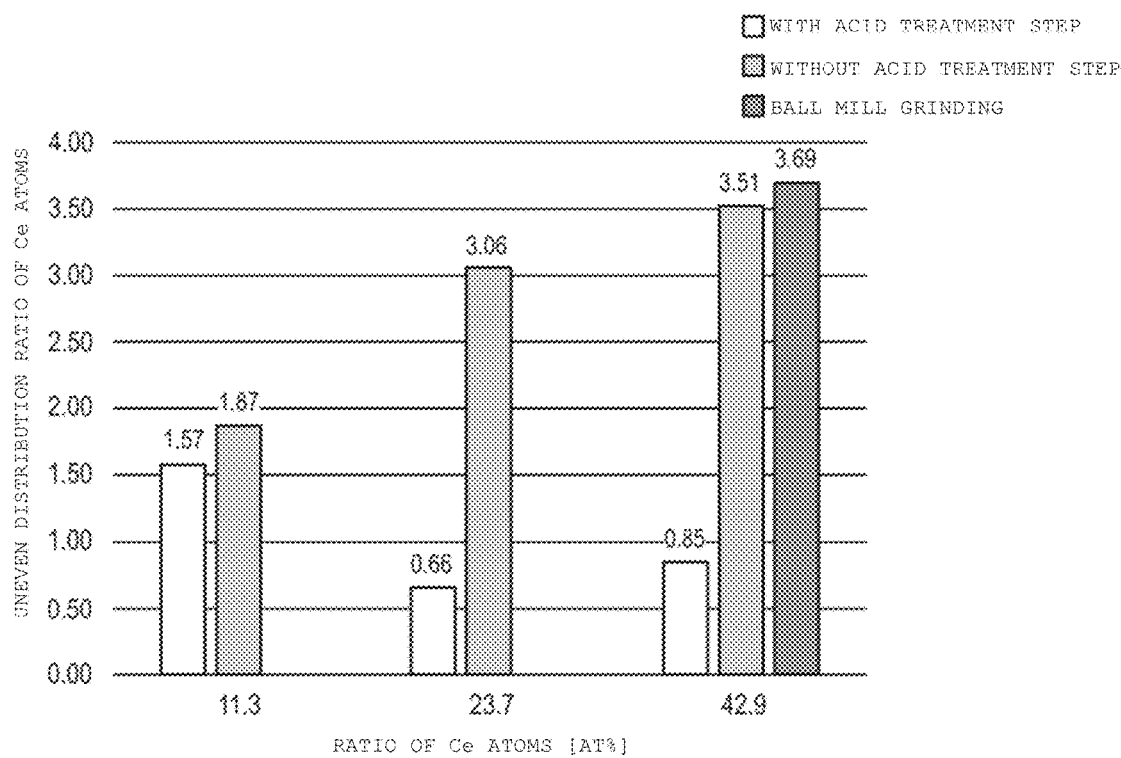
FIG. 1 is a graph showing uneven distribution ratios of cerium atoms of Ce—Zr composite oxide powders a, d, e, f, i, j, and k.

Hereinafter, embodiments of the present invention will be described, but the technical scope of the present invention should be determined based on the description of the scope of claims, and is not limited to the following embodiments. The numerical range "A to B" in the present specification means "A or more and B or less". Further, "A and/or B" means "either A or B" or "both A and B".

The Ce—Zr composite oxide according to one aspect of the present invention contains cerium and zirconium and is characterized in that an uneven distribution ratio of cerium atoms is 1.80 or less.

The method for producing a Ce—Zr composite oxide according to another embodiment of the present invention includes an acid treatment step of bringing at least one type of acid selected from the group consisting of sulfuric acid, nitric acid, and hydrochloric acid, in an amount of 4 to 28 parts by mass with respect to 100 parts by mass of the raw material composite oxide, into contact with the surface of a raw material composite oxide containing cerium and zirconium, and a calcination step of calcining the treated composite oxide obtained in the acid treatment step at 400 to 1200° C. for 5 to 300 minutes. Then, the method is characterized in that in the acid treatment step, the acid in the form of an aqueous solution is brought into contact with the surface of the raw material composite oxide, and the concentration of the acid in the aqueous solution is 15 to 80 mass %.

According to the present invention, in the Ce—Zr composite oxide, deterioration of the oxygen storage/release performance caused by long-term exposure to exhaust gas can be suppressed.

Although why the above problem can be solved by the present invention is not clear, the present inventor infers as follows. However, the present invention is not limited to the following mechanism.

The definition of the uneven distribution ratio of cerium atoms will be described in detail below, but in short, it represents a variation between the content ratio of cerium atoms at the surface of the Ce—Zr composite oxide and the content ratio of cerium atoms inside. That is, the smaller the uneven distribution ratio of cerium atoms is, the closer the distribution of cerium atoms at the surface and the distribution of cerium atoms inside are to each other, which means the difference in composition between the surface and the inside is smaller. According to the study of the present inventor, it was found that a conventional oxygen storage material has a small uneven distribution ratio of cerium atoms in an unused state immediately after production (not exposed to exhaust gas), but the uneven distribution ratio of cerium atoms increases after it is used as a catalyst for an exhaust gas purification treatment or the like (after exposure to exhaust gas). On the other hand, in the Ce—Zr composite oxide according to the present invention, the uneven distribution ratio of cerium atoms hardly changed between before and after use and remained small. Further, it was found that there is a correlation between the uneven distribution ratio of cerium atoms and the oxygen storage/release performance, and that the smaller the uneven distribution ratio is, the higher the exhibited oxygen storage/release performance. Based on this, the present inventor infers that in the conventional oxygen storage material, cerium atoms at the surface are lost by long-term use, and the surface crystal structure is changed. It is considered that due to the change in the surface crystal structure, the uniformity of the crystal structure between the surface and the inside is lost, oxygen atoms cannot be smoothly transferred and the oxygen storage/release performance deteriorates. On the other hand, in the Ce—Zr composite oxide according to the present invention, the surface crystal structure hardly changes, and therefore, it is inferred that cerium atoms at the surface are maintained even after long-term use. As a result, the uniformity of the crystal structure between the surface and the inside is maintained and oxygen atoms are smoothly transferred, and therefore, it is considered that a high oxygen storage/release performance can be maintained. Further, why such an operational effect is exhibited is considered to be because by performing a specific acid treatment step, the surface is dissolved and the crystal structure is changed to a stronger one.

<Ce—Zr Composite Oxide>

The Ce—Zr composite oxide according to the present invention is a Ce—Zr composite oxide containing cerium (Ce) and zirconium (Zr) and is characterized in that the uneven distribution ratio of cerium atoms is 1.80 or less. The Ce—Zr composite oxide functions as an oxygen storage material (OSC material) that allows oxidation/reduction reactions to proceed stably by storing oxygen in an oxidizing atmosphere (lean) and releasing oxygen in a reducing atmosphere (rich) in accordance with fluctuations in the air-fuel ratio (A/F) which changes depending on the operating conditions.

The Ce—Zr composite oxide indispensably contains cerium and zirconium as metal elements. Cerium and zirconium can be individually in the form of a metal and/or a metal oxide. That is, the Ce—Zr composite oxide may include cerium (metal) and/or ceria ($CeO_2$) and zirconium (metal) and/or zirconia ($ZrO_2$). Preferably, the Ce—Zr composite oxide contains ceria ($CeO_2$) and zirconia ($ZrO_2$).

The content ratio of cerium atoms in the Ce—Zr composite oxide is preferably 3 to 70 at %, more preferably 10 to 45 at %, even more preferably 15 to 45 at %, and particularly preferably 20 to 35 at % with respect to the total number of metal atoms in the Ce—Zr composite oxide. When it is within such a range, a Ce—Zr composite oxide having high oxygen storage/release performance is obtained.

The content ratio of zirconium atoms in the Ce—Zr composite oxide is preferably 30 to 97 at %, more preferably 45 to 80 at %, even more preferably 45 to 75 at %, and particularly preferably 60 to 70 at % with respect to the total number of metal atoms in the Ce—Zr composite oxide. When it is within such a range, a Ce—Zr composite oxide having high oxygen storage/release performance is obtained.

That is, according to a preferred embodiment of the present invention, in the Ce—Zr composite oxide, the content ratio of cerium atoms is 3 to 70 at % with respect to the total number of metal atoms, and the content ratio of zirconium atoms is 30 to 97 at % with respect to the total number of metal atoms.

The Ce—Zr composite oxide may further contain a metal element other than cerium and zirconium (hereinafter, also referred to as "another metal element") as needed. Another metal element includes lanthanum (La), praseodymium (Pr), neodymium (Nd), and yttrium (Y). That is, the Ce—Zr composite oxide may contain at least one of lanthanum, praseodymium, neodymium, and yttrium. Among these, it is preferable to contain at least one of lanthanum, praseodymium, and yttrium, it is more preferable to contain lanthanum and/or yttrium, and it is even more preferable to contain lanthanum and yttrium. Other metal atoms can be individually in the form of a metal and/or a metal oxide. Preferably, the Ce—Zr composite oxide contains lanthanum (metal) and/or lanthana (La$_2$O$_3$) and yttrium (metal) and/or yttria (Y$_2$O$_3$). More preferably, the Ce—Zr composite oxide contains lanthana (La$_2$O$_3$) and yttria (Y$_2$O$_3$).

When the Ce—Zr composite oxide contains lanthanum (preferably lanthana), the content ratio of lanthanum atoms in the Ce—Zr composite oxide is preferably 0 to 30 at % (0 at % or more than 0 at % and 30 at % or less), and more preferably 2 to 10 at % with respect to the total number of metal atoms in the Ce—Zr composite oxide. When it is within such a range, a sufficient content ratio of Ce or Zr atoms can be ensured, so that excellent oxygen storage/release performance can be achieved, and the thermal stability of the Ce—Zr composite oxide can be further improved.

The content ratio of praseodymium atoms in the Ce—Zr composite oxide is preferably 0 to 30 at % (0 at % or more than 0 at % and 30 at % or less), and more preferably 0 to 20 at % (0 at % or more than 0 at % and 20 at % or less) with respect to the total number of metal atoms in the Ce—Zr composite oxide. When it is within such a range, a sufficient content ratio of Ce or Zr atoms can be ensured, so that excellent oxygen storage/release performance can be achieved, and the thermal stability of the Ce—Zr composite oxide can be further improved.

The content ratio of neodymium atoms in the Ce—Zr composite oxide is preferably 0 to 30 at % (0 at % or more than 0 at % and 30 at % or less), and more preferably 0 to 20 at % (0 at % or more than 0 at % and 20 at % or less) with respect to the total number of metal atoms in the Ce—Zr composite oxide. When it is within such a range, a sufficient content ratio of Ce or Zr atoms can be ensured, so that excellent oxygen storage/release performance can be achieved.

The content ratio of yttrium atoms in the Ce—Zr composite oxide is preferably 0 to 30 at % (0 at % or more than 0 at % and 30 at % or less), and more preferably 3 to 10 at % with respect to the total number of metal atoms in the Ce—Zr composite oxide. When it is within such a range, a sufficient content ratio of Ce or Zr atoms can be ensured, so that excellent oxygen storage/release performance can be achieved.

That is, according to a preferred embodiment of the present invention, in the Ce—Zr composite oxide, with respect to the total number of metal atoms, the content ratio of cerium atoms is 3 to 70 at %, the content ratio of zirconium atoms is 30 to 97 at %, the content ratio of lanthanum atoms is 0 at % or more than 0 at % and 30 at % or less, and the content ratio of yttrium atoms is 0 at % or more than 0 at % and 30 at % or less.

In the present specification, the content ratio (at %) of each element in the Ce—Zr composite oxide is determined by the following X-ray fluorescence (XRF) analysis. In the XRF analysis, the analysis can be carried out by the calibration curve method, the internal standard method, or the fundamental parameter method.

<In-System Residual Ratio of Cerium Atoms>

The in-system residual ratio of cerium atoms is determined by XRF analysis of the Ce—Zr composite oxide before and after thermal aging. Specifically, XRF analysis is performed for the Ce—Zr composite oxide each before and after thermal aging by the method described in the Examples, and the in-system residual ratio of cerium atoms is calculated from the ratio ($Z_2/Z_1$) of the content ratio of cerium atoms after thermal aging ($Z_2$) to the content ratio of cerium atoms before thermal aging ($Z_1$). The in-system residual ratio serves as an index of the level of disappearance of cerium atoms from a powder (a remaining level in a powder system) by thermal aging. The closer this value is to 1, the fewer cerium atoms disappeared from the Ce—Zr composite oxide by thermal aging, which means that cerium atoms remain in the Ce—Zr composite oxide.

Further, it is found that by combining the in-system residual ratio of cerium atoms and the below-mentioned surface residual ratio of cerium atoms or uneven distribution ratio, the factor causing the difference in the surface residual ratio or the uneven distribution ratio is not due to the disappearance of cerium atoms to outside of the Ce—Zr composite oxide system, but due to the difference in the distribution of cerium atoms in the Ce—Zr composite oxide.

<Surface Residual Ratio of Cerium Atoms>

In the present specification, the surface residual ratio of cerium atoms is an index that shows the ratio of Ce atoms remaining in the vicinity of the surface when cerium atoms move from the vicinity of the surface to the inside of the Ce—Zr composite oxide by using the Ce—Zr composite oxide as an exhaust gas purification catalyst for a long period of time. The surface residual ratio of cerium atoms is specifically determined by measuring the surface Ce ratio before thermal aging ($Y_1$) and the surface Ce ratio after thermal aging ($Y_2$) by X-ray photoelectron spectroscopy (XPS) according to ISO 10810 for the Ce—Zr composite oxide each before and after thermal aging using the method described in the Examples. Then, the surface residual ratio of cerium atoms is calculated from the ratio thereof $Y_2/Y_1$.

The Ce—Zr composite oxide according to the present invention preferably has a surface residual ratio of cerium atoms of 0.91 or more. The surface residual ratio of cerium atoms is more preferably 0.94 or more, and even more preferably 0.95 or more.

If the surface residual ratio of cerium atoms is less than 0.91, cerium atoms are likely to disappear, and high oxygen storage/release performance may not be exhibitable over a long period of time. The surface residual ratio of cerium atoms is preferably closer to 1 in consideration of the above-mentioned operational effects. That is, the surface residual ratio of cerium atoms is preferably 0.91 or more and 1.00 or less, more preferably 0.94 or more and 1.00 or less, and even more preferably 0.95 or more and 1.00 or less.

In the present specification, the thermal aging (a treatment at 1,000° C. for 10 hours in a nitrogen gas stream containing 10 vol % of water vapor) is performed to virtually reproduce a state where the Ce—Zr composite oxide was used as an exhaust gas purification catalyst for a long period of time (after being exposed to exhaust gas for a long period of time). In order to determine whether or not a substance is a Ce—Zr composite oxide according to the present invention, independently of whether or not the Ce—Zr composite oxide has already been used, thermal aging shall be performed when measuring the uneven distribution ratio. This is because according to the above-mentioned mechanism, the disappearance of cerium atoms is considered to occur by the use as an exhaust gas purification catalyst, and therefore, when it is in an unused state (immediately after production), it cannot be determined whether the substance is a Ce—Zr composite oxide according to the present invention.

<Uneven Distribution Ratio of Cerium Atoms>

The Ce—Zr composite oxide according to the present invention is required to have an uneven distribution ratio of cerium atoms of 1.80 or less. The uneven distribution ratio of cerium atoms is preferably 1.57 or less, more preferably 1.5 or less (1.50 or less), even more preferably 0.9 or less (0.90 or less), particularly preferably 0.85 or less, and most preferably 0.66 or less.

The uneven distribution ratio of cerium atoms can be measured by X-ray photoelectron spectroscopy. Specifically, it is calculated by entering the surface Ce ratio ($X_1$) measured according to ISO 10810 and the internal Ce ratio ($X_2$) measured according to ISO 15969 (sputtering method) into Mathematical Formula 1 by the method described in Examples. For the Ce ratio measured according to ISO 10810, Ce at the surface of a powder is detected. On the other hand, when measurement is performed by the sputtering method, the inside at a distance of 1 nm or more from the surface of the powder is exposed, so that the internal Ce present at a distance of 1 nm or more from the surface of the powder is detected. Specifically, in the following Examples, sputtering (5 keV Ar monomer, 24 seconds) is performed to expose the inside at a distance of 10 nm from the surface of the powder, and internal Ce present at a distance of 10 nm from the surface of the powder is detected. The closer the uneven distribution ratio obtained as a result of substitution into Mathematical Formula 1 is to 1, the closer the surface and internal Ce ratios are to each other, which means that the uneven distribution of Ce is small. The farther the uneven distribution ratio obtained as a result of substitution into Mathematical Formula 1 is from 1, the more different the surface and internal Ce ratios are, which means that Ce is unevenly distributed.

[Math. 1]

[Mathematical Formula 1]

$$\text{Uneven distribution ratio of cerium atoms} = \sqrt{\left\{X_1 - \frac{(X_1 + X_2)}{2}\right\}^2 + \left\{X_2 - \frac{(X_1 + X_2)}{2}\right\}^2}$$

If the uneven distribution ratio of cerium atoms is larger than 1.80, sufficient oxygen storage/release performance may not be obtained due to long-term use. When the uneven distribution ratio of cerium atoms is large, the elemental composition greatly varies between the surface and the inside, and the structure is considered to be uneven. As a result, it is inferred that oxygen is not smoothly transferred and that the oxygen storage/release performance deteriorates. It is considered that the uneven distribution ratio of cerium atoms is preferably smaller in consideration of the above-mentioned operational effect, and therefore, the lower limit is preferably 0 or more, and more preferably 0.1 or more. That is, the uneven distribution ratio of cerium atoms is preferably 0 or more and 1.80 or less, more preferably 0 or more and 1.57 or less, even more preferably 0 or more and 1.5 or less (1.50 or less), still even more preferably 0 or more and 0.9 or less (0.90 or less), particularly preferably 0.1 or more and 0.85 or less, and most preferably 0.1 or more and 0.66 or less.

The volume-based average particle diameter (median diameter) of the Ce—Zr composite oxide according to the present invention is preferably 0.1 to 100 μm, and more preferably 1 to 30 μm. When the average particle diameter is within the above range, the adhesion of the Ce—Zr composite oxide after washcoating a refractory three-dimensional structure is good, which is preferable. In the present specification, the average particle diameter can be measured by a laser diffraction/scattering type particle size distribution measuring device.

The BET specific surface area of the Ce—Zr composite oxide according to the present invention is preferably 15 to 150 m$^2$/g, and more preferably 30 to 100 m$^2$/g. The BET specific surface area being 15 m$^2$/g or more is preferable from the viewpoint of further improving the oxygen storage/release performance and highly dispersing precious metal. When the BET specific surface area is 150 m$^2$/g or less, the viscosity does not become too high when forming a slurry, which is preferable. Further, as a result, washcoating can be stably carried out, which is preferable.

Crystal structures of the Ce—Zr composite oxide according to the present invention include a cubic crystal, a tetragonal crystal, a monoclinic crystal, an orthorhombic crystal, and the like, and preferably a cubic crystal, a tetragonal crystal, or a monoclinic crystal, more preferably a cubic crystal or a tetragonal crystal, and even more preferably a cubic crystal. When the crystal structure is a cubic crystal or a tetragonal crystal, thermal resistance is high, which is preferable.

<Method for Producing Ce—Zr Composite Oxide>

A conventional Ce—Zr composite oxide (a raw material composite oxide in the present invention) is produced by a method such as a neutralization coprecipitation method, a sol-gel method, a template method, a hydrothermal synthesis method, a reduction thermal aging method, and a wet grinding method. When the Ce—Zr composite oxide produced by such a method is directly used in a catalyst, when it is exposed to exhaust gas, Ce atoms move inside the Ce—Zr composite oxide, resulting in an uneven distribution of Ce atoms between the surface and the inside of the Ce—Zr composite oxide. As a result, the oxygen storage/release performance of the Ce—Zr composite oxide is deteriorated.

The Ce—Zr composite oxide according to the present invention is produced by subjecting a raw material composite oxide containing cerium and zirconium produced by the above-mentioned conventional method to a predetermined acid treatment, followed by calcination. That is, the method for producing a Ce—Zr composite oxide of the present invention includes an acid treatment step of bringing at least one type of acid selected from the group consisting of sulfuric acid, nitric acid, and hydrochloric acid, in an amount of 4 to 28 parts by mass with respect to 100 parts by mass of the raw material composite oxide, into contact with the surface of a raw material composite oxide containing cerium and zirconium, and a calcination step of calcining the treated composite oxide obtained in the acid treatment step at 400 to 1200° C. for 5 to 300 minutes. Then, the method is characterized in that in the acid treatment step, the acid in the form of an aqueous solution is brought into contact with the surface of the raw material composite oxide, and the concentration of the acid in the aqueous solution is 15 to 80 mass %. It is considered that by this production method, the uniformity of the crystal structure between the surface and the inside in the Ce—Zr composite oxide is maintained as described above, and deterioration of the oxygen storage/release performance caused by long-term exposure to exhaust gas is suppressed. That is, according to another aspect of the present invention, a method for stabilizing the crystal structure of a Ce—Zr composite oxide including the acid treatment step and the calcination step is provided. Hereinafter, the respective steps will be described in detail.

[Acid Treatment Step]

In the acid treatment step, at least one type of acid selected from the group consisting of sulfuric acid, nitric acid, and hydrochloric acid, in an amount of 4 to 28 parts by mass with respect to 100 parts by mass of the raw material composite oxide, into contact with the surface of a raw material composite oxide containing cerium and zirconium.

For the types of the metal elements contained in the raw material composite oxide as well as the content ratios thereof, the average particle diameter, the BET specific surface area, and the crystal structure of the raw material composite oxide, the same configurations can be adopted as for the above-mentioned Ce—Zr composite oxide. This is because the Ce—Zr composite oxide is the same as the raw material composite oxide except that the surface properties are different.

The acid is at least one type selected from the group consisting of sulfuric acid, nitric acid, and hydrochloric acid, and is preferably sulfuric acid or nitric acid, and more preferably nitric acid. By using such a strong acid and dissolving the surface, it is possible to change it to a uniform structure. Therefore, an oxygen storage/release material having high oxygen storage/release performance over a long period of time is obtained. Since a conventional Ce—Zr composite oxide (raw material composite oxide) has undergone a calcination step, Ce atoms hardly move freely. It is considered that when the Ce—Zr composite oxide in such a state is treated with a strong acid, Ce atoms are easily diffused in the direction in which the atoms are stably and homogeneously arranged. As a result, the Ce—Zr composite oxide after the acid treatment is in a state of having a stable and uniform Ce distribution.

The amount of the acid to be brought into contact with the raw material composite oxide is 4 to 28 parts by mass, preferably 6 to 18 parts by mass, and more preferably 7.5 to 16. 5 parts by mass with respect to 100 parts by mass of the raw material composite oxide. If the amount of the acid is less than 4 parts by mass or more than 28 parts by mass, an oxygen storage material having high oxygen storage/release performance over a long period of time is not obtained. Further, if the amount of acid is less than 4 parts by mass, the desired change in property due to the dissolution of the surface of the raw material composite oxide is not sufficiently achieved, which is not preferable. On the other hand, if the amount of acid is more than 28 parts by mass, the structure is significantly changed such as shrinkage of pores of the composite oxide, which is not preferable.

The acid in the form of an aqueous solution is brought into contact with the raw material composite oxide. The concentration of the aqueous acid solution is 15 to 80 mass %, and preferably 30 to 70 mass %. When the concentration is within the above range, the acid sufficiently acts on the surface of the raw material composite oxide, and an oxygen storage material having high oxygen storage/release performance over a long period of time is obtained.

The amount of the aqueous solution (aqueous acid solution) to be brought into contact with the raw material composite oxide is preferably 6.2 to 43.1 parts by mass, and more preferably 11.5 to 25.4 parts by mass with respect to 100 parts by mass of the raw material composite oxide. When the amount of the aqueous solution is within the above range, it can be evenly brought into contact with the entire surface of the raw material composite oxide, and also an internal unfavorable change in properties can be prevented, and therefore, an oxygen storage material having high oxygen storage/release performance over a long period of time is obtained.

A method of bringing the acid (aqueous acid solution) into contact with the raw material composite oxide is not particularly limited, but a method of adding the acid (aqueous acid solution) to the raw material composite oxide and kneading is preferable. When the acid (aqueous acid solution) is added to the raw material composite oxide, the acid (aqueous acid solution) is preferably divided into portions and added in multiple times while kneading the raw material composite oxide. By bringing the acid (aqueous acid solution) into contact with the raw material composite oxide in such a manner, the acid (aqueous acid solution) can be evenly brought into contact with the entire surface of the raw material composite oxide.

[Calcination Step]

In the calcination step, the treated composite oxide obtained in the acid treatment step is calcined.

The temperature in the calcination step is 400 to 1200° C., and more preferably 420 to 800° C. When the temperature is within the above range, the residue of the acid used in the acid treatment can be removed.

The time of the calcination step is 5 to 300 minutes, and more preferably 30 to 120 minutes. When the calcination time is within the above range, the residue of the acid used in the acid treatment can be removed.

The calcination step may be performed in any atmosphere such as air, oxygen gas, or a mixed gas of oxygen gas and an inert gas (for example, nitrogen gas or argon gas).

If necessary, the treated composite oxide obtained in the acid treatment step may be dried at a temperature (for example, 70 to 220° C.) lower than the temperature in the calcination step before the calcination step. Through such a drying step, moisture or the like contained in the treated composite oxide can be removed in advance.

By the above-mentioned production method, the Ce—Zr composite oxide according to the present invention is produced. That is, according to still another embodiment of the present invention, a Ce—Zr composite oxide produced by the method for producing a Ce—Zr composite oxide is provided.

<Exhaust Gas Purification Catalyst>

The Ce—Zr composite oxide according to the present invention has high oxygen storage/release performance over a long period of time. Therefore, the Ce—Zr composite oxide according to the present invention is suitable as an oxygen storage material (OSC material) of an exhaust gas purification catalyst. That is, according to another embodiment of the present invention, an exhaust gas purification catalyst containing the Ce—Zr composite oxide according to the present invention and a precious metal, each of which is supported on a three-dimensional structure, is provided.

Hereinafter, the present aspect will be described. To the exhaust gas purification catalyst (hereinafter, also simply referred to as "catalyst") according to the present embodiment, conventionally known components and techniques can be applied except that it contains the Ce—Zr composite oxide according to the present invention. Therefore, the present invention is not limited to the following embodiment.

The catalyst according to the present invention indispensably contains the Ce—Zr composite oxide according to the present invention. Here, the content (in terms of oxide) of the Ce—Zr composite oxide is preferably 5 to 200 g, more preferably 5 to 100 g, and even more preferably 10 to 90 g per liter of the three-dimensional structure. By containing the Ce—Zr composite oxide in such an amount, the oxidation/reduction reactions are enabled to proceed stably.

(Precious Metal)

The catalyst according to the present invention indispensably contains a precious metal. The precious metal catalyzes oxidation/reduction reactions to purify exhaust gas. Here, the type of the precious metal is not particularly limited, and examples thereof include platinum (Pt), palladium (Pd), rhodium (Rh), and the like. These precious metals may be used alone or two or more types may be used in combination. Among these, the precious metal is preferably at least one type selected from platinum, palladium, and rhodium, more preferably palladium alone; a combination of platinum and/or palladium and rhodium, and particularly preferably palladium alone, or a combination of palladium and rhodium. That is, according to a preferred embodiment of the present invention, the precious metal is at least one type selected from the group consisting of platinum, palladium, and rhodium. Further, according to a more preferred embodiment of the present invention, the precious metal is palladium alone, or at least one of platinum and palladium, and rhodium. According to a particularly preferred embodiment of the present invention, the precious metal is palladium, or palladium and rhodium.

The content (in terms of metal) of platinum is preferably 0.01 to 20 g, more preferably 0.05 to 10 g, and even more preferably more than 0.5 g and less than 5 g per liter of the three-dimensional structure in consideration of the exhaust gas purification performance.

The content (in terms of metal) of palladium is preferably 0.01 to 20 g, more preferably 0.05 to 5 g, and even more preferably 0.3 to 3 g per liter of the three-dimensional structure in consideration of the exhaust gas (particularly HC) purification performance.

The content (in terms of metal) of rhodium is preferably 0.01 to 20 g, more preferably 0.05 to 5 g, and even more preferably 0.1 to 3 g per liter of the three-dimensional structure in consideration of the exhaust gas (particularly NOx) purification performance.

When the precious metal includes palladium and rhodium, the mass ratio of palladium to rhodium (palladium:rhodium, in terms of metal) is preferably 30:1 to 1.1:1, more preferably 20:1 to 1.3:1, and even more preferably 8:1 to 1.5:1. When the mass ratio of palladium to rhodium is within the above range, the exhaust gas purification efficiency can be improved.

(Refractory Inorganic Oxide)

The catalyst according to the present invention may contain a refractory inorganic oxide other than the Ce—Zr composite oxide of the present invention as needed. The refractory inorganic oxide has a function as a carrier for supporting a catalytic component such as a precious metal, a rare earth metal, another metal element, or the like. The refractory inorganic oxide has a high specific surface area, and by supporting the catalytic component thereon, the contact area between the catalytic component and the exhaust gas can be increased or the reactant can be adsorbed. As a result, the reactivity of the entire catalyst can be further enhanced.

Examples of the refractory inorganic oxide include alumina, zeolite, titania, zirconia, silica, and the like. Among these refractory inorganic oxides, only one type may be used alone, or two or more types may be used in combination. Among these, alumina and zirconia are preferable, and alumina is more preferable from the viewpoint of high temperature durability and high specific surface area. Here, the alumina preferably used as the refractory inorganic oxide is not particularly limited as long as it contains an oxide of aluminum, and Examples thereof include active alumina such as γ, δ, η, and θ-alumina, lanthana-containing alumina, silica-containing alumina, silica-titania-containing alumina, silica-titania-zirconia-containing alumina, and the like. Among these alumina compounds, only one type may be used alone, or two or more types may be used in combination. Among these, γ, δ, or θ-alumina, or lanthana-containing alumina is preferable from the viewpoint of high temperature durability and high specific surface area.

The content of the refractory inorganic oxide is preferably 10 to 300 g, and more preferably 40 to 200 g per liter of the three-dimensional structure. When the content of the refractory inorganic oxide is 10 g/L or more, the precious metal can be sufficiently dispersed in the refractory inorganic oxide, and a catalyst having more sufficient durability is obtained. On the other hand, when the content of the refractory inorganic oxide is 300 g/L or less, the contact state between the precious metal and the exhaust gas becomes good, and exhaust gas purification performance can be more sufficiently exhibited.

When the catalyst according to the present invention contains the Ce—Zr composite oxide according to the present invention and the refractory inorganic oxide, the mass ratio of the Ce—Zr composite oxide to the refractory inorganic oxide is preferably 1:9 to 1:0.1, and more preferably 1:2 to 1:0.25. At such a ratio, a sufficient amount of the catalytic component can be supported on the refractory inorganic oxide, and the contact area between the catalytic component and exhaust gas is increased. In addition, the Ce—Zr composite oxide can store and release a sufficient amount of oxygen, and can sufficiently adsorb hydrocarbons (HC), carbon monoxide (CO), and nitrogen oxides (NOx) in exhaust gas. As a result, the reactivity of the catalyst is further improved, and high exhaust gas purification performance can be exhibited.

(Other Components)

The catalyst according to the present invention may further contain other components. Examples of the other components include group II elements such as magnesium (Mg), calcium (Ca), strontium (Sr), and barium (Ba). These elements may be contained in the exhaust gas purification catalyst in the form of an oxide, a nitrate, or a carbonate. Among these, barium and/or strontium is preferable, and strontium oxide (SrO), barium sulfate (BaSO$_4$), and/or barium oxide (BaO) is more preferable. Among these other components, one type may be used alone or two or more types may be used in combination.

When the catalyst according to the present invention contains other components, the content (in terms of oxide) of the other components (particularly SrO, BaSO$_4$, and BaO) is preferably 0 to 50 g, more preferably 0.1 to 30 g, and even more preferably 0.5 to 20 g per liter of the three-dimensional structure.

(Three-Dimensional Structure)

The three-dimensional structure functions as a carrier for supporting the Ce—Zr composite oxide, the precious metal, the refractory inorganic oxide, and other components. As the three-dimensional structure, a refractory three-dimensional structure known in the present technical field can be appropriately adopted. As the three-dimensional structure, for example, a heat-resistant carrier such as a honeycomb carrier having through holes (gas passage holes, cell shape) with a triangular shape, a quadrangular shape, or a hexagonal shape can be used. A carrier can be adequately used as long as the cell density (number of cells/unit sectional area) is 100 to 1200 cells/square inch, preferably 200 to 900 cells/square inch, and more preferably 400 to 900 cells/square inch (1 inch=25.4 mm).

Hereinafter, a preferred embodiment of the method for producing the catalyst of the present invention will be described. However, the present invention is not limited to the following preferred embodiment.

That is, the Ce—Zr composite oxide according to the present invention, a precious metal source, and if necessary, other components as described above (for example, a refractory inorganic oxide, a rare earth metal, or other components) and an aqueous medium are appropriately weighed and mixed according to the desired composition, followed by stirring at 5 to 95° C. for 0.5 to 24 hours (if necessary, wet grinding after stirring), thereby preparing a slurry. Here, as the aqueous medium, water (pure water, ultrapure water, deionized water, distilled water, or the like), a lower alcohol such as ethanol or 2-propanol, an organic alkaline aqueous solution, or the like can be used. Among them, it is preferable to use water or a lower alcohol, and it is more preferable to use water. The amount of the aqueous medium is not particularly limited, but is preferably such an amount that the ratio of the solid content (solid mass concentration) in the slurry is 10 to 60 mass %, and more preferably 30 to 50 mass %.

Subsequently, the slurry prepared above is applied to the three-dimensional structure. As a method of applying the slurry onto the three-dimensional structure, a known method such as washcoating can be appropriately adopted. Further, the application amount of the slurry can be appropriately set by those skilled in the art according to the amount of a solid matter in the slurry and the thickness of a catalyst layer to be formed. The application amount of the slurry is preferably such an amount that the amount (supported amount) of each component becomes as described above.

Subsequently, the three-dimensional structure, after applying the slurry thereto as described above, is dried in air preferably at a temperature of 70 to 200° C. for 5 minutes to 5 hours. Subsequently, the thus obtained dried slurry coating film (catalyst precursor layer) is calcined in air at a temperature of 400° C. to 900° C. for 10 minutes to 3 hours. Under such conditions, the catalytic components (the precious metal, the Ce—Zr composite oxide, etc.) can be efficiently adhered to the three-dimensional structure.

According to the above description, the catalyst of the present invention can be produced. As described above, the catalyst according to the present invention may have only one catalyst layer or have a structure in which two or more catalyst layers are laminated as long as it has the Ce—Zr composite oxide according to the present invention. When the catalyst of the present invention has a structure in which two or more catalyst layers are laminated, the Ce—Zr composite oxide according to the present invention may be placed in any catalyst layer. Preferably, the Ce—Zr composite oxide according to the present invention is located in a layer containing at least palladium. Due to such a location, the maximum performance of the Ce—Zr composite oxide according to the present invention can be exhibited.

<Method for Purifying Exhaust Gas>

The catalyst of the present invention can exhibit high purification performance for exhaust gas (hydrocarbons (HC), carbon monoxide (CO), and nitrogen oxides (NOx)). Therefore, according to still another embodiment of the present invention, a method for purifying exhaust gas including bringing the exhaust gas purification catalyst according to the present invention into contact with exhaust gas is provided. The catalyst according to the present invention can be applied to exhaust gas from an internal combustion engine, but can be particularly preferably used for exhaust gas from a gasoline engine. The exhaust gas purification efficiency (purification performance) using a gasoline engine can be evaluated, for example, by a temperature (T50 (° C.)) when the purification efficiency for each of CO, THC, and NOx in the following light-off (LO) test reaches 50%. A lower T50 indicates that the catalyst exhibits higher exhaust gas purification performance.

The temperature of exhaust gas may be any temperature as long as it is the temperature of exhaust gas during normal operation of a gasoline engine, and is preferably 0 to 1500° C., and more preferably 25 to 700° C. In the present specification, the "temperature of exhaust gas" means the temperature of exhaust gas at a catalyst inlet. Here, the "catalyst inlet" refers to a portion 15 cm from the end face of the catalyst on the exhaust gas inflow side.

Although the catalyst of the present embodiment can exhibit a sufficient catalytic activity by itself, a similar or different exhaust gas purification catalyst may be placed upstream (inflow side) or downstream (outflow side) of the catalyst according to the present invention. That is, it is preferable that the catalyst according to the present invention is placed alone, or the catalyst according to the present invention is placed both upstream (inflow side) and downstream (outflow side), or the catalyst of the present invention is placed either upstream (inflow side) or downstream (outflow side), and a conventionally known exhaust gas purification catalyst is placed at the other side.

EXAMPLES

Hereinafter, the present invention will be more specifically described using Examples and Comparative Examples, but the present invention is not limited to the following Examples. Unless otherwise specified, represents mass % and the ratio represents mass ratio. In addition, unless otherwise specified, operations and measurement of physical properties or the like are performed under the conditions of room temperature (10 to 30° C.)/relative humidity of 20 to 80% RH.

In the following, an example is shown in which a Ce—Zr composite oxide obtained by neutralization coprecipitation method was used as the raw material composite oxide, but even when a Ce—Zr composite oxide obtained by another method is used as the raw material composite oxide, similar results were obtained.

Example 1

Basic zirconium nitrate in an amount of 40 g in terms of $ZrO_2$ was weighed and dispersed in pure water, thereby obtaining a dispersion liquid. Subsequently, an aqueous cerium nitrate solution in an amount of 50 g in terms of $CeO_2$, and an aqueous lanthanum nitrate solution in an amount of 10 g in terms of $La_2O_3$ were weighed and added to the dispersion liquid. After the obtained mixed liquid was stirred for 0.5 hours, the pH was adjusted to 7 with an aqueous sodium hydroxide solution, thereby forming a precipitate. Subsequently, the obtained precipitate was recovered by filtration, and the recovered precipitate was calcined at 400° C. for 3 hours, thereby obtaining a cubic raw material composite oxide powder a0. Subsequently, 30 g of the powder a0 was weighed, and 7.5 g of a 65% aqueous sulfuric acid solution (the amount of the acid with respect to 100 parts by mass of the raw material composite oxide was 16.2 parts by mass) was added little by little thereto and kneaded (acid treatment step). Subsequently, the powder a0 after the acid treatment step was dried at 120° C. for 12 hours (drying step), and then calcined at 500° C. for 1 hour (calcination step), thereby obtaining a Ce—Zr composite oxide powder a (average particle diameter: 14.1 μm, BET specific surface area: 46.4 $m^2/g$).

Example 2

A Ce—Zr composite oxide powder b (average particle diameter: 14.0 μm, BET specific surface area: 46.6 $m^2/g$)

was obtained in the same manner as in Example 1 except that in the acid treatment step, the amount of the 65% aqueous sulfuric acid solution was changed to 3.6 g (the amount of the acid with respect to 100 parts by mass of the raw material composite oxide was 7.7 parts by mass).

Comparative Example 1

A Ce—Zr composite oxide powder c (average particle diameter: 14.6 µm, BET specific surface area: 46.1 m$^2$/g) was obtained in the same manner as in Example 1 except that in the acid treatment step, the amount of the 65% aqueous sulfuric acid solution was changed to 13.8 g (the amount of the acid with respect to 100 parts by mass of the raw material composite oxide was 30.0 parts by mass).

Comparative Example 2

A Ce—Zr composite oxide powder d (average particle diameter: 13 µm, BET specific surface area: 47.5 m$^2$/g) was obtained in the same manner as in Example 1 except that the acid treatment step was not performed.

Comparative Example 3

30 g of the raw material composite oxide powder a0 produced in the same manner as in Example 1 was weighed and added to pure water (in an amount such that the ratio of the solid content after adding the aqueous sulfuric acid solution becomes 45 mass %), and 3.6 g of a 65% aqueous sulfuric acid solution (the amount of the acid with respect to 100 parts by mass of the raw material composite oxide was 7.7 parts by mass) was added thereto, followed by stirring for 0.5 hours, thereby obtaining a dispersion liquid. The concentration of the aqueous acid solution contained in the dispersion liquid at this time was 3.5 mass %. Subsequently, the dispersion liquid was ground with a ball mill for 14 hours, thereby obtaining a slurry e0. Subsequently, the slurry e0 was dried at 120° C. for 12 hours (drying step), and then calcined at 500° C. for 1 hour (calcination step), thereby obtaining a Ce—Zr composite oxide powder e (average particle diameter: 2.3 µm, BET specific surface area: 47.2 m$^2$/g).

Example 3

Basic zirconium nitrate in an amount of 30 g in terms of ZrO$_2$ was weighed and dispersed in pure water, thereby obtaining a dispersion liquid. Subsequently, an aqueous cerium nitrate solution in an amount of 60 g in terms of CeO$_2$, an aqueous lanthanum nitrate solution in an amount of 5 g in terms of La$_2$O$_3$, and yttrium nitrate in an amount of 5 g in terms of Y$_2$O$_3$ were weighed and added to the dispersion liquid. After the obtained mixed liquid was stirred for 0.5 hours, the pH was adjusted to 7 with an aqueous sodium hydroxide solution, thereby forming a precipitate. Subsequently, the obtained precipitate was recovered by filtration, and the recovered precipitate was calcined at 400° C. for 3 hours, thereby obtaining a cubic raw material composite oxide powder f0. Subsequently, 30 g of the powder f0 was weighed, and 7.5 g of a 65% aqueous sulfuric acid solution (the amount of the acid with respect to 100 parts by mass of the raw material composite oxide was 16.2 parts by mass) was added little by little thereto and kneaded (acid treatment step). Subsequently, the powder f0 after the acid treatment step was dried at 120° C. for 12 hours (drying step), and then calcined at 500° C. for 1 hour (calcination step), thereby obtaining a Ce—Zr composite oxide powder f (average particle diameter: 12.7 µm, BET specific surface area: 77.1 m$^2$/g).

Example 4

A Ce—Zr composite oxide powder g (average particle diameter: 13.3 µm, BET specific surface area: 78.0 m$^2$/g) was obtained in the same manner as in Example 3 except that in the acid treatment step, the amount of the 65% aqueous sulfuric acid solution was changed to 3.6 g (the amount of the acid with respect to 100 parts by mass of the raw material composite oxide was 7.7 parts by mass).

Comparative Example 4

A Ce—Zr composite oxide powder h (average particle diameter: 13.0 µm, BET specific surface area: 76.8 m$^2$/g) was obtained in the same manner as in Example 3 except that in the acid treatment step, the amount of the 65% aqueous sulfuric acid solution was changed to 13.8 g (the amount of the acid with respect to 100 parts by mass of the raw material composite oxide was 30.0 parts by mass).

Comparative Example 5

A Ce—Zr composite oxide powder i (average particle diameter: 13.7 µm, BET specific surface area: 80.3 m$^2$/g) was obtained in the same manner as in Example 3 except that the acid treatment step was not performed.

Example 5

Basic zirconium nitrate in an amount of 75 g in terms of ZrO$_2$ was weighed and dispersed in pure water, thereby obtaining a dispersion liquid. Subsequently, an aqueous cerium nitrate solution in an amount of 15 g in terms of CeO$_2$, an aqueous lanthanum nitrate solution in an amount of 5 g in terms of La$_2$O$_3$, and yttrium nitrate in an amount of 5 g in terms of Y$_2$O$_3$ were weighed and added to the dispersion liquid. After the obtained mixed liquid was stirred for 0.5 hours, the pH was adjusted to 7 with an aqueous sodium hydroxide solution, thereby forming a precipitate. Subsequently, the obtained precipitate was recovered by filtration, and the recovered precipitate was calcined at 400° C. for 3 hours, thereby obtaining a cubic raw material composite oxide powder j0. Subsequently, 30 g of the powder j0 was weighed, and 7.5 g of a 65% aqueous sulfuric acid solution (the amount of the acid with respect to 100 parts by mass of the raw material composite oxide was 16.2 parts by mass) was added little by little thereto and kneaded (acid treatment step). Subsequently, the powder j0 after the acid treatment step was dried at 120° C. for 12 hours (drying step), and then calcined at 500° C. for 1 hour (calcination step), thereby obtaining a Ce—Zr composite oxide powder j (average particle diameter: 12.5 µm, BET specific surface area: 77.8 m$^2$/g).

Comparative Example 6

A Ce—Zr composite oxide powder k (average particle diameter: 13.1 µm, BET specific surface area: 79.0 m$^2$/g) was obtained in the same manner as in Example 5 except that the acid treatment step was not performed.

The amount of the acid per 100 parts by mass of the raw material composite oxide used in the acid treatment step and the ratio of each metal atom in the Ce—Zr composite oxide are shown in the following Table 1.

TABLE 1

| | Powder | Amount of acid (parts by mass*) | Ratio of each metal atom (at %) | | | | Remarks |
|---|---|---|---|---|---|---|---|
| | | | Ce | Zr | La | Y | |
| Example 1 | a | 16.2 | 42.9 | 48.0 | 9.1 | 0.0 | kneading |
| Example 2 | b | 7.7 | 42.9 | 48.0 | 9.1 | 0.0 | kneading |
| Comparative Example 1 | c | 30.0 | 42.9 | 48.0 | 9.1 | 0.0 | kneading |
| Comparative Example 2 | d | 0.0 | 42.9 | 48.0 | 9.1 | 0.0 | kneading |
| Comparative Example 3 | e | 7.7 | 42.9 | 48.0 | 9.1 | 0.0 | ball mill grinding |
| Example 3 | f | 16.2 | 23.7 | 66.1 | 4.2 | 6.0 | kneading |
| Example 4 | g | 7.7 | 23.7 | 66.1 | 4.2 | 6.0 | kneading |
| Comparative Example 4 | h | 30.0 | 23.7 | 66.1 | 4.2 | 6.0 | kneading |
| Comparative Example 5 | i | 0.0 | 23.7 | 66.1 | 4.2 | 6.0 | kneading |
| Example 5 | j | 16.2 | 11.3 | 79.0 | 4.0 | 5.7 | kneading |
| Comparative Example 6 | k | 0.0 | 11.3 | 79.0 | 4.0 | 5.7 | kneading |

*Amount per 100 parts by mass of raw material composite oxide

<Measurement of Physical Properties>
[Thermal Aging]
Each powder was treated at 1,000° C. for 10 hours in a nitrogen gas stream containing 10 vol % of water vapor.
[Measurement of Uneven Distribution Ratio of Cerium Atoms]
The uneven distribution ratios of cerium atoms of the Ce—Zr composite oxide powders (powders a, d, e, f, i, j, and k) after thermal aging were measured by XPS under the following measurement conditions.
    Measuring device: AXIS-NOVA manufactured by Shimadzu Corporation
    X-ray output: Al monochrome 100 W
    Beam diameter: 400 µm$^2$
    Beam output: 10 kV, 10 mA
    Beam irradiation time: 100 ms per point
    Scan step: 100 meV
    Path energy: 40 eV The powder after thermal aging was ground using a mortar. XPS measurement was performed for the surface of the powder after grinding, and the content ratio (at %) of Ce atoms with respect to the total number of Ce atoms and Zr atoms was calculated from the spectrum obtained by integrating each element 15 times. The obtained value is defined as the surface Ce ratio ($X_1$). Subsequently, in order to measure the inside of the powder, sputtering (5 keV Ar monomer, 24 seconds) was performed to expose the inside at a distance of 10 nm from the surface of the powder. The content ratio (at %) of Ce atoms with respect to the total number of Ce atoms and Zr atoms was calculated from the spectrum obtained by integrating each element 15 times from the inside of the exposed powder. The obtained value is defined as the internal Ce ratio ($X_2$). Then, the uneven distribution ratio of cerium atoms was calculated using the above Mathematical Formula 1. The results are shown in Table 2 and FIG. 1.

TABLE 2

| | Powder | Amount of acid (parts by mass*) | Ratio of Ce atoms (at %) | Uneven distribution ratio of Ce atoms |
|---|---|---|---|---|
| Example 1 | a | 16.2 | 42.9 | 0.85 |
| Comparative Example 2 | d | 0.0 | | 3.51 |

TABLE 2-continued

| | Powder | Amount of acid (parts by mass*) | Ratio of Ce atoms (at %) | Uneven distribution ratio of Ce atoms |
|---|---|---|---|---|
| Comparative Example 3 | e | 7.7 | | 3.69 |
| Example 3 | f | 16.2 | 23.7 | 0.66 |
| Comparative Example 5 | i | 0.0 | | 3.06 |
| Example 5 | j | 16.2 | 11.3 | 1.57 |
| Comparative Example 6 | k | 0.0 | | 1.87 |

*Amount per 100 parts by mass of raw material composite oxide

From Table 2 and FIG. 1, it was shown that the Ce—Zr composite oxide obtained by the production method of the present invention has an uneven distribution ratio of cerium atoms of 1.80 or less. In particular, it was shown that the uneven distribution ratios are remarkably small in the powders a and f having a large ratio of Ce atoms (23.7 to 42.9 at %). The small uneven distribution ratio indicates that the ratio of cerium atoms at the surface is close to the ratio of cerium atoms inside. This suggested that the Ce—Zr composite oxide according to the present invention has a more uniform structure from the inside to the surface.

When the same measurement was also performed for the powders b and g, it was confirmed that the uneven distribution ratio of cerium atoms was 1.80 or less.
[Measurement of Surface Residual Ratio of Cerium Atoms]
The surface residual ratios of cerium atoms of the Ce—Zr composite oxide powders (powders a to e, and f to i) after thermal aging were measured by X-ray photoelectron spectroscopy (XPS) under the following measurement conditions.
    Measuring device: AXIS-NOVA manufactured by Shimadzu Corporation
    X-ray output: Al monochrome 100 W
    Beam diameter: 400 µm$^2$
    Beam output: 10 kV, 10 mA
    Beam irradiation time: 100 ms per point
    Scan step: 100 meV
    Path energy: 40 eV First, the powder before thermal aging was ground using a mortar. XPS measurement was performed for the surface of the powder after grinding, and the content ratio (at %) of Ce atoms with respect to the total number of respective Ce, Zr, La, and Y atoms was calculated from the spectrum obtained by integrating each element 15 times. The obtained value is defined as the surface Ce ratio before thermal aging ($Y_1$). Aside from this, also for the powder after thermal aging, XPS measurement was performed in the same manner as for the powder before thermal aging, and the surface Ce ratio after thermal aging ($Y_2$) was determined. Then, the surface residual ratio of cerium atoms was calculated according to the formula: Surface residual ratio of cerium atoms=$Y_2/Y_1$. The results are shown in Table 3 and FIGS. 2A and 2B.

TABLE 3

| | Powder | Amount of acid (parts by mass*) | Ratio of Ce atoms (at %) | Surface residual ratio of Ce atoms |
|---|---|---|---|---|
| Example 1 | a | 16.2 | 42.9 | 1.00 |
| Example 2 | b | 7.7 | | 1.00 |
| Comparative Example 1 | c | 30.0 | | 0.81 |
| Comparative Example 2 | d | 0.0 | | 0.88 |
| Comparative Example 3 | e | 7.7 | | 0.82 |
| Example 3 | f | 16.2 | 23.7 | 0.97 |
| Example 4 | g | 7.7 | | 0.95 |
| Comparative Example 4 | h | 30.0 | | 0.90 |
| Comparative Example 5 | i | 0.0 | | 0.90 |

*Amount per 100 parts by mass of raw material composite oxide

Figure 2A:
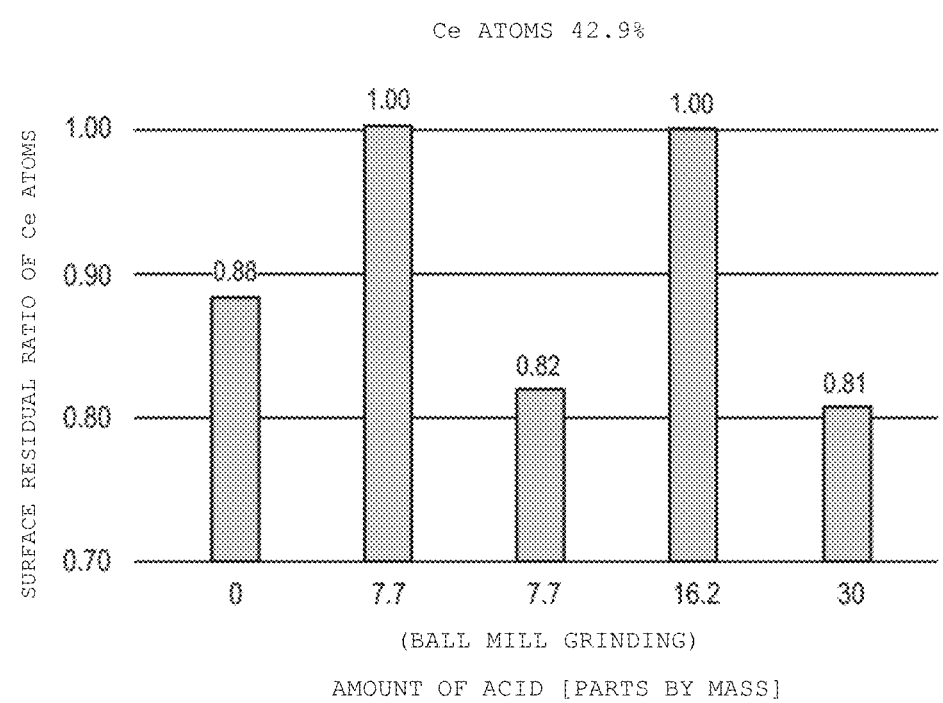
FIG. 2A is a graph showing surface residual ratios of cerium atoms of the Ce—Zr composite oxide powders a to e.
Figure 2B:
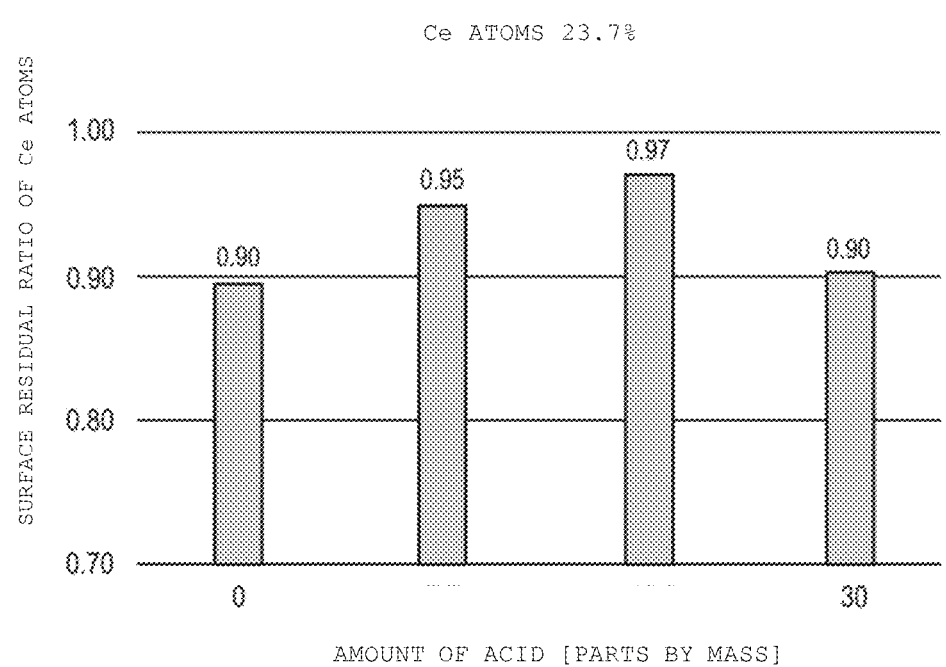
FIG. 2B is a graph showing surface residual ratios of cerium atoms of the Ce—Zr composite oxide powders f to i.

From Table 3 and FIGS. 2A and 2B, it was shown that the Ce—Zr composite oxide obtained by the production method of the present invention has a surface residual ratio of cerium atoms of 0.91 or more. The surface residual ratio close to 1 indicates that the ratio of cerium atoms at the surface does not decrease even after thermal aging. This suggested that the Ce—Zr composite oxide according to the present invention undergoes little surface structural change even when it is used for a long period of time.

[In-System Residual Ratio of Cerium Atoms]

The in-system residual ratios (the percentage change in the ratios of cerium atoms contained in the whole powder) of the Ce—Zr composite oxide powders (powders a to e, and f to i) before and after thermal aging were measured by X-ray fluorescence (XRF) under the following measurement conditions. In the measurement, S8 Tiger manufactured by BRUKER, Inc. was used.

First, the powder before thermal aging was ground using a disc mill and molded into a circular plate having a diameter of 31 mm and a thickness of 5 mm using a press machine, thereby preparing a sample. The sample was subjected to XRF analysis, and the content ratio (at %) of cerium atoms was calculated when the total number of atoms of Ce and Zr and other components (all metal elements such as Nd, La, Pr, and Y) was assumed to be 100% by the fundamental parameter method from the obtained spectra. The obtained value is defined as the in-system Ce ratio before thermal aging ($Z_1$). Aside from this, XRF analysis was performed in the same manner for the powder after thermal aging, and the in-system Ce ratio after thermal aging ($Z_2$) was determined. Then, the in-system residual ratio of cerium atoms was calculated according to the formula: In-system residual ratio of cerium atoms=$Z_2/Z_1$. The results are shown in Table 4 and FIGS. 3A and 3B.

TABLE 4

| | Powder | Amount of acid (parts by mass*) | Ratio of Ce atoms (at %) | In-system residual ratio of Ce atoms |
|---|---|---|---|---|
| Example 1 | a | 16.2 | 42.9 | 1.00 |
| Example 2 | b | 7.7 | | 1.02 |
| Comparative Example 1 | c | 30.0 | | 1.01 |
| Comparative Example 2 | d | 0.0 | | 0.99 |
| Comparative Example 3 | e | 7.7 | | 0.99 |
| Example 3 | f | 16.2 | 23.7 | 0.97 |
| Example 4 | g | 7.7 | | 0.97 |
| Comparative Example 4 | h | 30.0 | | 0.99 |
| Comparative Example 5 | i | 0.0 | | 0.97 |

*Amount per 100 parts by mass of raw material composite oxide

Figure 3A:
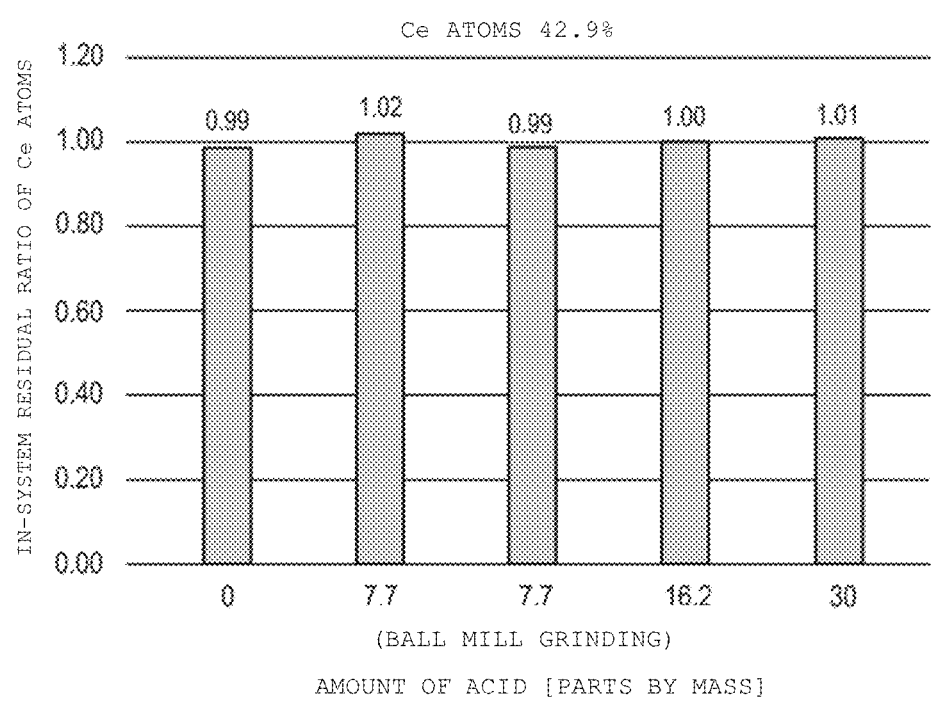
FIG. 3A is a graph showing percentage changes in in-system residual ratios of cerium atoms of the Ce—Zr composite oxide powders a to e.
Figure 3B:
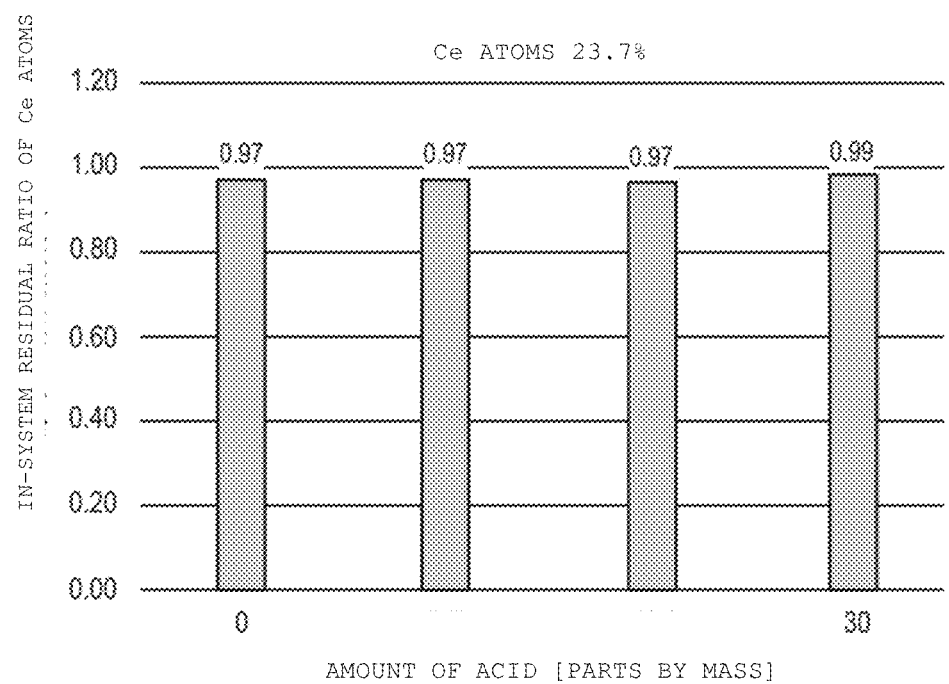
FIG. 3B is a graph showing in-system residual ratios of cerium atoms of the Ce—Zr composite oxide powders f to i.

From Table 4 and FIGS. 3A and 3B, it was shown that in the Ce—Zr composite oxide obtained by the production method of the present invention, the ratio of cerium atoms in the entire Ce—Zr composite oxide is substantially constant before and after thermal aging regardless of the amount of the acid used in the acid treatment step. This suggested that Ce in the Ce—Zr composite oxide hardly disappears from the system due to volatilization or the like due to thermal aging.

From the above results, it was confirmed that the differences in the uneven distribution ratio of cerium atoms and the surface residual ratio of cerium atoms are not due to the disappearance of Ce from the powder system, but due to the difference in the location of Ce atoms in the powder system and the difference in the uneven distribution state thereof.

<Performance Evaluation>

[Oxygen Storage/Release Performance]

The Ce—Zr composite oxide powders (powders a to e, and f to i) after thermal aging were evaluated for oxygen storage/release performance using the $H_2$-TPR (Temperature Programmed Reduction) method (measuring device: full-automatic catalyst gas adsorption measuring device R-6015, manufactured by Hemmi Slide Rule Co., Ltd.).

First, the powder was ground using a mortar. 0.5 g of the ground powder was heated to 500° C. and held in high-purity oxygen gas for 10 minutes, thereby sufficiently oxidizing the powder. Subsequently, the powder was cooled to 50° C. and then heated from 50° C. to 700° C. at a temperature raising rate of 10° C./min in a 5 vol % hydrogen-nitrogen gas stream (100 mL/min). Water produced during this period was measured by a TCD (Thermal Conductivity Detector). Then, the temperature at which the production amount of water per unit time peaked was measured. Note that the production of water indicates that oxygen is released from the Ce—Zr composite oxide. The results are shown in Table 5 and FIGS. 4A and 4B.

TABLE 5

| | Powder | Amount of acid (parts by mass*) | Ratio of Ce atoms (at %) | Peak temperature (° C.) | Remarks |
|---|---|---|---|---|---|
| Example 1 | a | 16.2 | 42.9 | 533.1 | kneading |
| Example 2 | b | 7.7 | | 547.2 | kneading |
| Comparative Example 1 | c | 30.0 | | 630.1 | kneading |

TABLE 5-continued

| | Powder | Amount of acid (parts by mass*) | Ratio of Ce atoms (at %) | Peak temperature (° C.) | Remarks |
|---|---|---|---|---|---|
| Comparative Example 2 | d | 0.0 | | 637.4 | kneading |
| Comparative Example 3 | e | 7.7 | | higher than 700 | ball mill grinding |
| Example 3 | f | 16.2 | 23.7 | 485.8 | kneading |
| Example 4 | g | 7.7 | | 540.1 | kneading |
| Comparative Example 4 | h | 30.0 | | 601.2 | kneading |
| Comparative Example 5 | i | 0.0 | | 630.9 | kneading |

*Amount per 100 parts by mass of raw material composite oxide

Figure 4A:
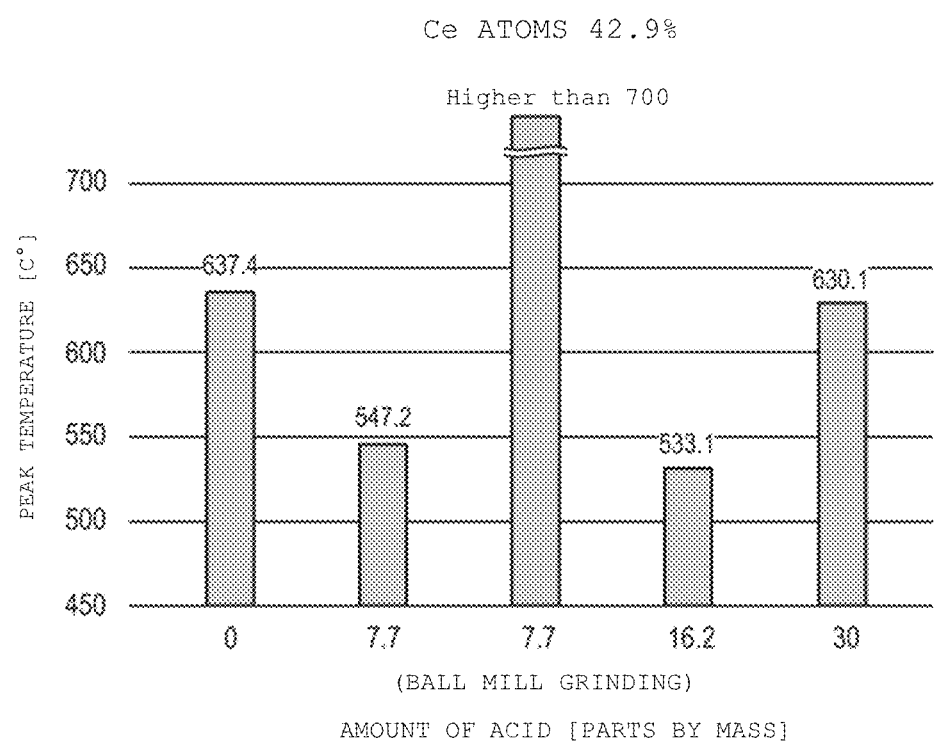
FIG. 4A is a graph showing oxygen storage/release capacities of the Ce—Zr composite oxide powders a to e.
Figure 4B:
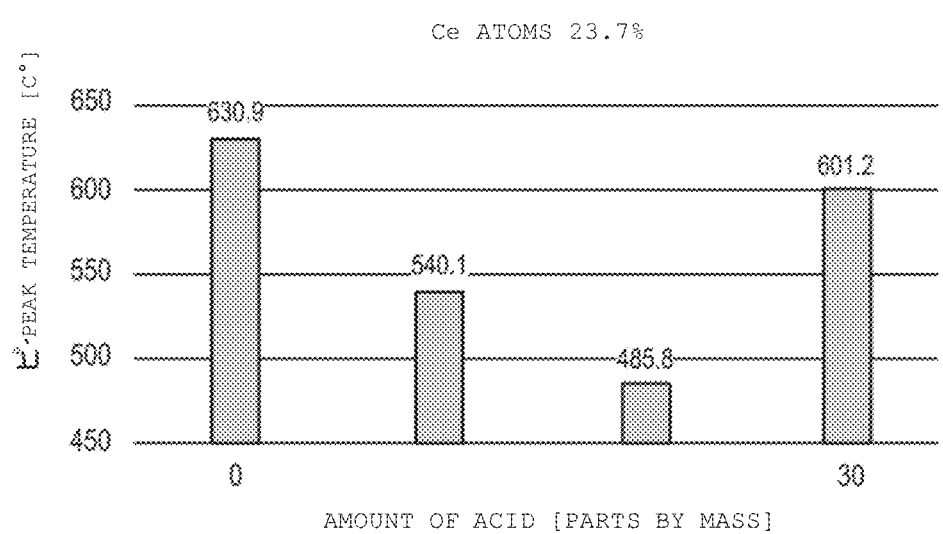
FIG. 4B is a graph showing oxygen storage/release capacities of the Ce—Zr composite oxide powders f to i.

From Table 5 and FIGS. 4A and 4B, it was shown that the Ce—Zr composite oxide according to the present invention has a significantly lower peak temperature. The low peak temperature indicates that oxygen is released at a lower temperature (that is, the oxygen storage/release performance is excellent). Further, in the powder e, no peak of water production was observed in the measured temperature range. From this, it was found that the same effect is not exhibited even if sulfuric acid is allowed to act on the raw material Ce—Zr composite oxide by the method of wet grinding with a ball mill in the aqueous acid solution at a low concentration.

As described above, it is considered that the Ce—Zr composite oxide according to the present invention undergoes little surface structural change even after being exposed to exhaust gas for a long period of time. Therefore, it was inferred that the transfer of oxygen atoms from the surface to the inside (oxygen storage) and the transfer of oxygen atoms from the inside to the surface (oxygen release) become smoother, and excellent oxygen storage/release performance is exhibited.

[Exhaust Gas Purification Performance]

Exhaust gas purification catalysts were produced using the Ce—Zr composite oxide powders (powders a and d), and the exhaust gas purification performance of the catalysts was evaluated.

(Production of Exhaust Gas Purification Catalyst)

Example 6

Palladium nitrate as a Pd raw material, the powder a, barium sulfate nonahydrate, and lanthana-containing alumina (3 parts by mass of lanthana with respect to 100 parts by mass of lanthana-containing alumina) were mixed at a mass ratio of 1:44:11:44 and dispersed in pure water. This dispersed aqueous solution was stirred for 1 hour and then wet ground with a ball mill, thereby obtaining a slurry A0 having an average particle diameter of 3.8 µm. This slurry A0 was washcoated onto a cylindrical cordierite carrier having a diameter of 103 mm, a length of 105 mm, and 600 cells/square inch as a three-dimensional structure in an amount of 100 g per liter of the cordierite carrier. Subsequently, the resultant was dried at 150° C. for 15 minutes, and then calcined in air at 550° C. for 30 minutes, thereby obtaining a catalyst A.

Comparative Example 7

A catalyst D was obtained in the same manner as in Example 6 except that the powder d was used in place of the powder a, and 11 g of a 65% aqueous sulfuric acid solution (the amount of the acid with respect to 100 parts by mass of the raw material composite oxide was 16.2 parts by mass) was added immediately before performing wet grinding with a ball mill.

(Engine Thermal Aging)

Catalysts A and D were each set in a catalytic converter, which was installed at a position downstream of an exhaust port of a 4.6-liter engine, and exhaust gas was allowed to pass through the catalyst. Here the exhaust gas was discharged from the engine operating for 50 hours in a mode periodically repeating stoichiometric (A/F=14.6), rich (A/F=13.8), and fuel cut cycles so that the catalyst Bed temperature reached a maximum of 1,000° C.

(Measurement of Exhaust Gas Purification Performance)

Catalysts A and D after thermal aging were each installed 30 cm downstream of an exhaust port of an in-line 6-cylinder 2-liter engine. Exhaust gas in which the A/F was made to fluctuate at an amplitude of ±0.5 with 14.6 as the center at a frequency of 1 Hz was allowed to flow through the catalyst (space velocity: 150,000$^{-1}$). The temperature of the catalyst was raised from 150° C. to 500° C. at a temperature raising rate of 50° C./min. The temperature of the exhaust gas at this time was measured with a thermocouple installed at a position 15 cm from the end face of the catalyst on the exhaust gas inflow side. The gas was sampled upstream of the end face of the catalyst on the exhaust gas inflow side and downstream of the end face of the catalyst on the exhaust gas outflow side, and the purification efficiency for each of CO, HC, and NOx was calculated. The temperature when the purification efficiency reached 50% (Light-off T50) is shown in FIG. 5.

Figure 5:
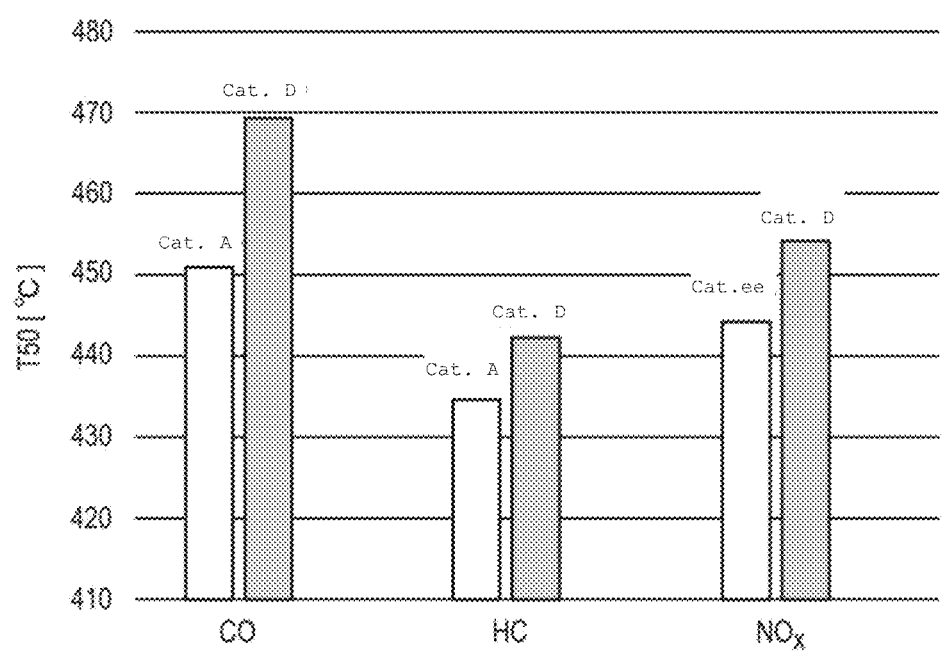
FIG. 5 is a graph showing exhaust gas purification performances after thermal aging of exhaust gas purification catalysts A and D containing the Ce—Zr composite oxide powders a and d, respectively.

From FIG. 5, it was shown that the catalyst according to the present invention has a significantly lower Light-off T50 for all of CO, HC, and NOx. The low Light-off T50 indicates that the exhaust gas purification performance is high.

[A/F Fluctuation Absorption Performance]

A converter into which the catalyst A or D after thermal aging was set was installed downstream of a 2.4 L MPI engine. The catalyst inlet temperature was fixed at 550° C. and an operation was performed whereby the A/F was set to 15.1 and then switched to 14.3. When switching from 15.1 to 14.3, the amount of time for which the A/F on the catalyst outlet side was maintained in a range from 14.7 to 14.5 (near the theoretical air-fuel ratio) was determined. The results are shown in FIG. 6.

Figure 6:
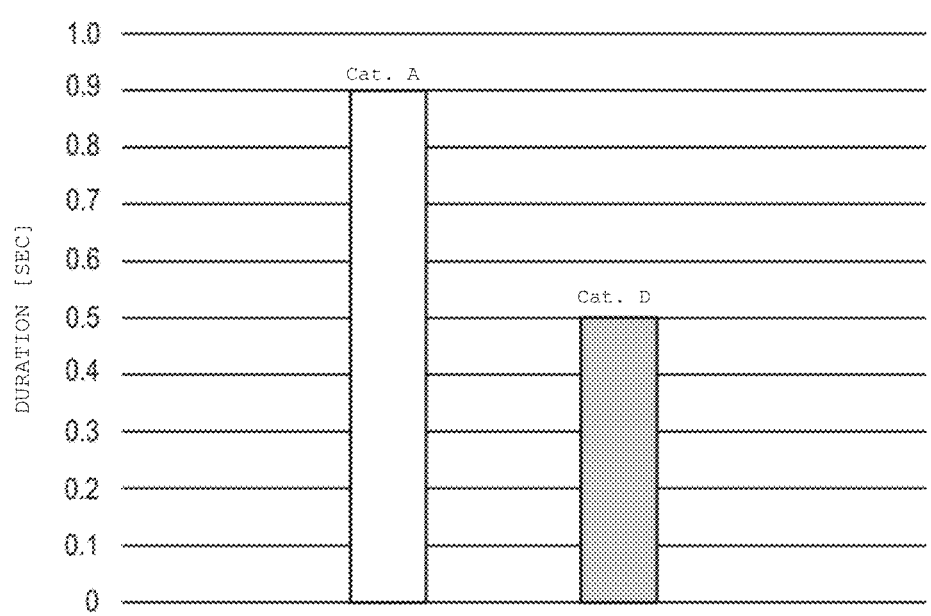
FIG. 6 is a graph showing A/F fluctuation absorption performances after thermal aging of the exhaust gas purification catalysts A and D containing the Ce—Zr composite oxide powders a and d, respectively.

From FIG. 6, it was shown that the catalyst according to the present invention can maintain an air-fuel ratio near the theoretical air-fuel ratio for a longer period of time.

The present application is based on Japanese Patent Application No. 2020-100958 filed on Jun. 10, 2020, the disclosed content of which is incorporated by reference in its entirety.

The invention claimed is:

1. An exhaust gas purification catalyst, comprising: a Ce—Zr composite oxide comprising cerium and zirconium with an uneven distribution ratio of cerium atoms that is 1.80 or less; and a precious metal, each of which is supported on a three-dimensional structure, wherein the uneven distribution ratio is calculated, relative to the Ce—Zr composite oxide in a state where the Ce—Zr composite oxide has been aged at 1000° C. for 10 h in a nitrogen gas stream containing 10 vol.-% of water vapor, according to the following formula:

Uneven distribution ratio of cerium atoms =

$$\sqrt{\left\{X_1 - \frac{(X_1 + X_2)}{2}\right\}^2 + \left\{X_2 - \frac{(X_1 + X_2)}{2}\right\}^2}$$

wherein X1 equals the surface Ce ratio (X1) measured according to ISO 10810, and X2 equals the internal Ce ratio (X2) measured according to ISO 15969 (sputtering method), and wherein the Ce—Zr composite oxide has a surface residual ratio of cerium atoms of 0.91 or more and 1.00 or less.

2. The exhaust gas purification catalyst according to claim 1, wherein the Ce—Zr composite oxide has a surface residual ratio of cerium atoms of 0.95 or more and 1.00 or less.

3. The exhaust gas purification catalyst according to claim 1, wherein the Ce—Zr composite oxide has a content ratio of cerium atoms of 3 to 70 at % with respect to the total number of metal atoms in the Ce—Zr composite oxide, and a content ratio of zirconium atoms of 30 to 97 at % with respect to the total number of metal atoms in the Ce—Zr composite oxide.

4. The exhaust gas purification catalyst according to claim 1, wherein the Ce—Zr composite oxide has a content ratio of cerium of 10 to 45 at % with respect to the total number of metal atoms in the Ce—Zr composite oxide.

5. The exhaust gas purification catalyst according to claim 4, wherein the Ce—Zr composite oxide has a content ratio of cerium of 20 to 45 at % with respect to the total number of metal atoms in the Ce—Zr composite oxide.

6. The exhaust gas purification catalyst according to claim 5, wherein the Ce—Zr composite oxide has a content ratio of cerium of 20 to 35 at %.

7. The exhaust gas purification catalyst according to claim 1, wherein the uneven distribution ratio of cerium atoms is 0 or more and 0.9 or less.

8. The exhaust gas purification catalyst according to claim 1, wherein the uneven distribution ratio of cerium atoms is 0 or more and 0.66 or less.

9. The exhaust gas purification catalyst according to claim 1, further comprising a refractory inorganic oxide, with a mass ratio of the Ce—Zr composite oxide to the refractory inorganic oxide being 1:2 to 1:0.25.

10. The exhaust gas purification catalyst according to claim 1, wherein the Ce—Zr composite oxide has an average particle size of 12.5 to 30 µm.

11. The exhaust gas purification catalyst according to claim 1, wherein the three-dimensional structure is a honeycomb carrier having only one catalyst layer, and wherein the one catalyst layer includes the Ce—Zr composite oxide and the precious metal.

12. The exhaust gas purification catalyst according to claim 11, wherein the precious metal in the one catalyst layer is palladium alone.

13. The exhaust gas purification catalyst of claim 1, wherein the Ce—Zr composite oxide is produced with:

an acid treatment step of bringing at least one type of acid selected from the group consisting of sulfuric acid, nitric acid, and hydrochloric acid, in an amount of 4 to 28 parts by mass with respect to 100 parts by mass of the raw material composite oxide, into contact with the surface of a raw material composite oxide containing cerium and zirconium; and a calcination step of calcining the treated composite oxide obtained in the acid treatment step at 400 to 1200° C. for 5 to 300 minutes, wherein in the acid treatment step, the acid in the form of an aqueous solution is brought into contact with the surface of the raw material composite oxide, and the concentration of the acid in the aqueous solution is 15 to 80 mass %.

14. The exhaust gas purification catalyst according to claim 2, wherein the Ce—Zr composite oxide has an in-system residual ratio of cerium atoms of 0.97 to 1.02.

15. A method for purification of exhaust gas, comprising bringing the exhaust gas purification catalyst according to claim 6 into contact with exhaust gas.

* * * * *